United States Patent [19]

Printiss, Sr. et al.

[11] Patent Number: 4,640,536
[45] Date of Patent: Feb. 3, 1987

[54] TUBE CLAMP ASSEMBLY

[75] Inventors: Frederick H. Printiss, Sr.; Irvy T. Barker, both of Stoughton, Wis.

[73] Assignee: Nelson Industries, Inc., Stoughton, Wis.

[21] Appl. No.: 833,544

[22] Filed: Feb. 27, 1986

[51] Int. Cl.$^4$ ............................................. F16L 19/02
[52] U.S. Cl. .................................. 285/367; 285/420; 24/279
[58] Field of Search ............... 285/367, 410, 411, 420; 24/279, 280, 283, 286, 19, 277, 278

[56] References Cited

U.S. PATENT DOCUMENTS

| 492,855 | 3/1893 | Weidaw . | |
|---|---|---|---|
| 1,052,112 | 2/1913 | Welch . | |
| 1,268,934 | 6/1918 | Crabill . | |
| 1,468,297 | 9/1923 | Hogg et al. . | |
| 2,241,042 | 5/1941 | Scarritt | 24/19 |
| 2,821,768 | 2/1958 | Beckham et al. | 285/420 X |
| 3,329,296 | 7/1967 | Muth | 24/277 X |
| 3,429,014 | 2/1969 | Roche | 24/279 |
| 3,722,041 | 3/1973 | Munse | 24/283 |
| 3,900,933 | 8/1975 | Engman et al. | 24/277 |
| 3,984,134 | 10/1976 | Engman et al. | 285/382 |
| 4,275,469 | 6/1981 | Johansson et al. | 24/279 |
| 4,492,393 | 1/1985 | Schaub | 285/236 |

OTHER PUBLICATIONS

Heco Dyna-Grip—Exhaust System Clamp.
G & H Industries Super Lock Muffler Clamp.
Mercury Clamp Engineering Specifications.
Nelson Muffler Corporation—Band Clamps.
AP Parts Company—Clamps for the Long Haul.
G.E.S. Products Pty Ltd. "Versatile New Clamp Offers Many Advantages".
Nelson Division—Strap Clamp Chart.
Bryant Clamp Corporation.
Mercury Metal Products—V-Section Clamps.
Mercury Metal Products—Truck Seal Clamp.
Torca Products Inc.—Open Butt Joint Exhaust Sealing Clamp.
Flexonics Division UOP Inc. Interlocked Exhaust Connectors.
Federal Metal Hose Corporation, Exhaust Clamps.
FAF-TECH Company.

Primary Examiner—Dave W. Arola
Attorney, Agent, or Firm—Andrus, Sceales, Starke & Sawall

[57] ABSTRACT

A clamp assembly for clamping unslotted overlapping ends of metal tubes in an exhaust system. The clamp assembly includes a metal ring having a generally circular cross section and the ends of the ring are in overlapping contacting relation. One leg of a generally U-shaped bracket is secured to each overlapping end, while the other leg of the bracket engages the outer surface of the other end of the ring to urge the overlapping ends of the ring into contacting relation. A bolt extends through the aligned openings in the brackets, and the axis of the bolt is in a plane passing through the line of contact between the overlapping ends. The head of the bolt bears against the side edge of one bracket while a nut threaded on the opposite end of the bolt bears against the side edge of the other bracket. By threading down the bolt, the ring is contracted in diameter to provide a low cost, strong, 360° closure for clamping the tubes.

12 Claims, 5 Drawing Figures

TUBE CLAMP ASSEMBLY

BACKGROUND OF THE INVENTION

Tube clamps are used in exhaust systems to clamp the overlapping ends of metal tubes. As used in exhaust systems, a tube clamp should be low cost and sufficiently strong to deform 16 gauge unslotted metal tubes.

It is also desirable that the clamp provide a full 360° closure to provide a positive gas tight seal. This is particularly important in off-road and construction equipment where the exhaust system extends vertically and is often located adjacent to the operator.

A tube clamp should also be reusable so that it does not have to be discarded when removed. In addition a tube clamp should be adaptable to various size tubes to reduce the tooling cost and inventory.

In the past, band clamps have been commonly used in exhaust systems, but the normal band clamp cannot deform unslotted metal tubes to provide a gas-tight seal. Thus, band clamps have normally required slotted tube ends in order to deform the tubes and provide a seal. Moreover, the conventional band clamp does not provide a full 360° closure.

Another common clamp, as used in the past, is the strap clamp which is low in cost but does not offer a 360° seal. Other conventional clamps that provide a 360° seal are more complicated and expensive.

SUMMARY OF THE INVENTION

The invention is directed to an improved clamp assembly for clamping unslotted overlapping ends of metal tubes in an exhaust system. In accordance with the invention, the clamp assembly comprises a metal ring having a generally circular cross section and the ends of the ring are in overlapping contacting relation.

One leg of a generally U-shaped bracket is welded to each overlapping end and the opposite leg of the bracket is disposed in engagement with the outer surface of the other overlapping end of the ring to urge the overlapping ends into contacting relation.

A bolt extends through the aligned U-shaped brackets and the axis of the bolt is in a plane passing through the line of contact between the overlapping ends of the ring. The head of the bolt bears against the side edge of one bracket, while a nut threaded on the opposite end of the bolt bears against the side edge of the other bracket.

By threading down the nut, the brackets are brought together to contract the ring in diameter and provide a positive clamping action for the overlapping ends of the tubes.

In a second form of the invention, the ends of the tubes, instead of being in telescopic or lapping relation, are formed with outwardly curled or rolled ends that are in abutting end-to-end relation. A split annular member straddles the abutting curled ends, and has a central circumferential groove to receive the clamping assembly. In addition, the side edges of the annular member are bent inwardly and engage the outer extremities of the curled ends. By tightening the clamping assembly, the annular member is contracted in diameter to wedge the curled ends of the tubes axially toward each other and provide a positive seal between the tubes.

The clamp assembly of the invention is low cost, yet is capable of crushing or deforming unslotted 16 gauge steel tube to provide a positive seal between the overlapping ends of the tubes.

The clamp assembly provides a full 360° closure to provide a positive gas tight seal, and thereby prevent any leakage of emissions from the joint between the tubes.

As a further advantage, the clamp assembly is reuseable. The brackets attached to the overlapping ends of the rings are not threaded and by cutting the bolt, the clamp can be removed and reused, requiring only a new bolt.

Further, the clamp can be used for a variety of different sized tubes. This is a substantial advantage in that it reduces tooling costs and inventory of clamps.

The clamp is capable of maintaining a positive clamping action even when subjected to extreme conditions of heat, stress, road shock or engine vibration.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
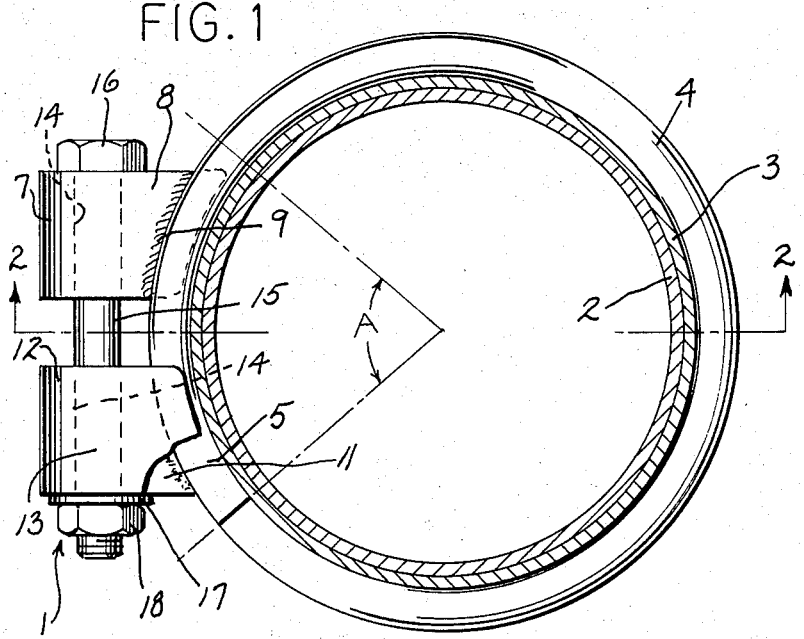
FIG. 1 is a end view of the clamp assembly as positioned around the overlapping ends of a pair of tubes.
Figure 3:
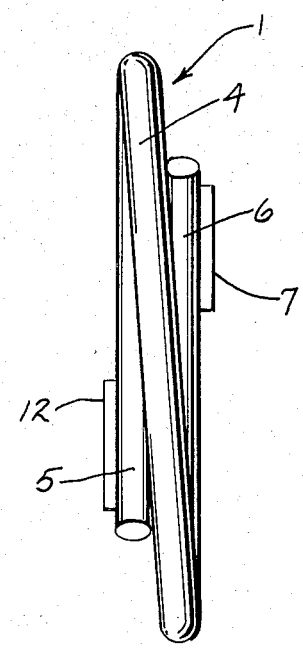
FIG. 3 is an end view of the structure of FIG. 1 with the tubes removed.

FIG. 1 shows a clamp assembly 1 for joining the overlapping, unslotted ends of two metal tubes 2 and 3. The clamp assembly has particular use in an exhaust system for an internal combustion engine.

Clamp assembly 1 includes a metal ring 4 having a generally circular cross section and the ends 5 and 6 of ring 4 are disposed in overlapping contacting relation. As best shown in FIG. 1, the ends 5 and 6 overlap through an arc A of about 70° to 90° and preferably about 80°.

Figure 2:
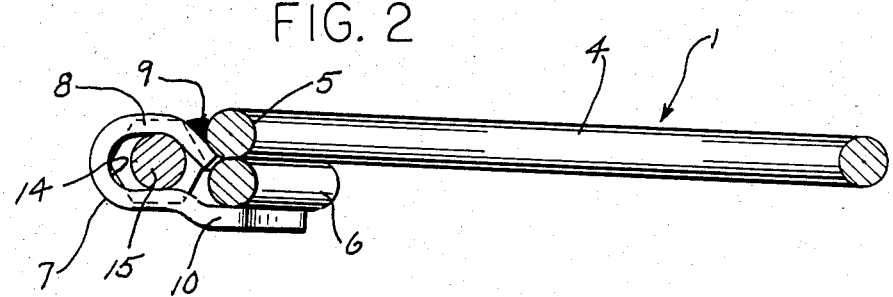
FIG. 2 is section taken along line 2—2 of FIG. 1 with the tubes removed.

Secured to the overlapping end 5 is a generally U-shaped bracket 7. As best shown in FIG. 2, one leg 8 of bracket 7 is secured by weld 9 to end 5, while the opposite leg 10 of bracket 7 is engaged with the outer surface of end 6 and serves to urge end 6 into contact with end 5 as shown in FIG. 2. As ring 4 is contracted and expanded, as will be hereinafter described, end 6 can slide relative to end 10 of bracket 7.

Similarly, one leg 11 of a U-shaped bracket 12 is welded to end 6 and the opposite leg 13 of bracket 12 bears against the outer surface of overlapping end 5 to urge end 5 against end 6.

The brackets 7 and 12 each define an opening 14, and a fastening member, such as a bolt 15 extends through the aligned openings 14. Bolt 15 includes a head 16 which is engaged with the side edge of bracket 7, while the opposite end of the bolt 15 is threaded and receives a washer 17 and nut 18. Washer 17 bears against the outer side edge of bracket 12.

As shown in FIG. 2, the axis of bolt 15 lies in a plane that extends through the line of contact between the overlapping ends 5 and 6. By threading down nut 18, ring 4 will be contracted in diameter to provide a full 360° clamping action against the tubes 2 and 3. As the axis of the bolt is aligned with the plane passing between the line of contact between ends 5 and 6, ring 4 will be contracted circumferentially without twisting.

Figure 4:
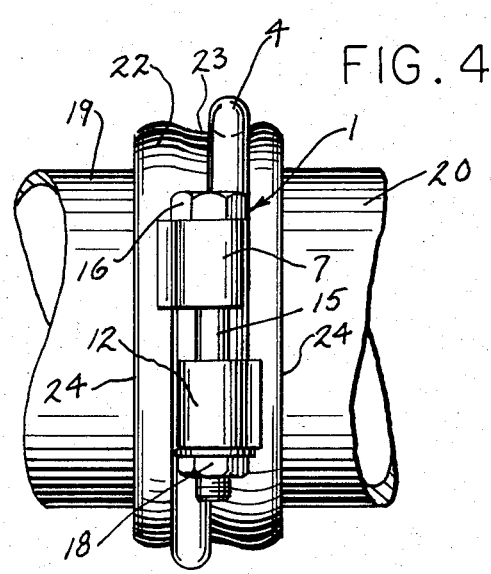
FIG. 4 is a side elevation of a modified form of the invention in which the clamp is employed to connect the curled ends of two tubes.
Figure 5:
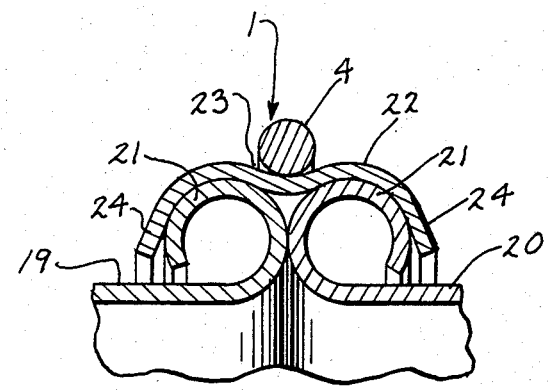
FIG. 5 is an enlarged fragmentary longitudinal section of the structure shown in FIG. 4.

FIGS. 4 and 5 illustrate a modified form of the invention in which the clamp assembly 1 is employed to connect the curled ends of a pair of tubes 19 and 20. As best shown in FIG. 4, the adjacent ends of tubes 19 and 20 are rolled or curled outwardly as indicated by 21 and ends 21 are disposed in abutting relation. A split ring 22 straddles the abutting curled ends 21. Ring 22 can be formed with a single slit or can be formed with a plurality of slits, so that the ring can be positioned around the curled ends 21.

As shown in FIG. 4, ring 22 is formed with a central circumferential groove 23 that receives ring 4 of clamping assembly 1, and the side edges 24 of ring 22 are curved or bent inwardly and engage the respective curled ends 21. As ring 4 is contracted in diameter by threading down of nut 18 on bolt 15, the bent side edge 24 provide a wedging or camming action to move the curled ends 21 axially toward each other into tight engagement to provide a seal.

The clamp assembly of the invention is of simple and inexpensive construction and provides a positive 360° seal between the tubes and the sealing arrangement will not be effected by extreme conditions of heat, stress, road shock or engine vibration.

A clamp assembly of standard size can be used for various diameter tubes and this substantially reduces the cost of tooling as well as the inventory of clamps. As a further advantage the tube clamp is reuseable.

While the above description has illustrated the clamp assembly of the invention as being used to connect tubes in a exhaust system, it is contemplated that the clamp assembly can be used in other applications for joining tubular members.

Various modes of carrying out the invention are contemplated as being within the scope of the following claims particulary pointing out and distinctly claiming the subject matter which is regarded as the invention.

We claim:

1. A clamp assembly for clamping overlapping ends of metal tubes, comprising a ring having a pair of overlapping ends disposed in direct contact with each other, and a generally U-shaped bracket for each of said ends, said U-shaped bracket having opposing legs and means securing one leg of each bracket to one of said ends and the opposite leg of said bracket being disposed in contact with the outer surface of the other of said ends whereby said other end can slide relative to the respective bracket, each bracket defining an opening with said openings being in alignment, and fastening means extending freely through said aligned openings for drawing said brackets in a direction toward each other to contract said ring and clamp said tubes.

2. The assembly of claim 1, wherein each bracket has an outer side edge and said fastening means includes a first end portion disposed in engagement with an outer side edge of one bracket and including a second end portion disposed in engagement with an outer side edge of the other bracket, said fastening means also having a central section extending through said aligned openings and interconnecting said end portions, the axis of said central section disposed in a plane extending through the line of contact between said overlapping ends.

3. The assembly of claim 2 wherein said fastening means comprises a bolt and said first portion comprises a head of said bolt, and said second portion comprises a nut threaded on the bolt.

4. The clamping assembly of claim 1, wherein said securing means for the first end of each bracket is a welded connection to the corresponding overlapping end.

5. The clamping assembly of claim 1, wherein said ring is generally circular in cross section.

6. The clamping assembly of claim 1, wherein said ends are overlapped through an arc in the range 70° to 90°.

7. A clamp assembly for clamping the unslotted overlapping ends of metal tubes, comprising a ring having a pair of overlapping end portions disposed in side-by-side contact with each other, a generally U-shaped bracket secured to each of said end portions said U-shaped bracket having opposing legs and means securing, one leg of each bracket one of said end portions and the opposite leg of each bracket comprising a guide to slidably engage the opposite end portion, each bracket defining an opening with the openings being in alignment, and a bolt extending through said aligned openings with the axis of the bolt disposed in a plane extending through the line of contact between said end portions.

8. The clamp assembly of claim 7, wherein each bracket has an outside edge and said bolt has a head engaged with the outer side edge of one of said brackets, and a nut threaded on the opposite end of the bolt and engaged with the outer side edge of the other of said brackets, whereby threading of said nut on said bolt will draw the brackets in a direction toward each other to reduce the diameter of said ring and provide a clamping action for the tubes.

9. The clamp assembly of claim 7, wherein said ring is generally circular in cross section and the end portions are overlapped through an arc of 70° to 90°.

10. In an exhaust system, a pair of tubes disposed in axial alignment, the adjacent ends of said tubes being curled outwardly and disposed in end-to-end relation, an annular member straddling the curled ends of said tubes, said annular member having a pair of circumferential side edges disposed inwardly at an angle to the axis of said tubes and disposed in contact with the respective curled ends, and a clamping assembly disposed around said annular member and disposed between said side edges, said clamping assembly including a ring having a pair of overlapping end portions disposed in side-by-side contact with each other, a bracket for each end portion and defining a guide track for sliding movement of the opposite end portion, and means securing each bracket to a each end portion and each bracket defining an opening, said openings being disposed in alignment, and connecting means extending through said aligned openings for drawing said brackets in a direction toward each other to contract said ring in diameter and thereby move said angular side edges inwardly against the respective curled ends to wedge the curled ends axially toward each other and provide a seal therebetween.

11. The system of claim 10, wherein said annular member has a circumferential groove to receive said ring.

12. The system of claim 10, wherein said annular member has a longitudinal interruption.

* * * * *

UNITED STATES PATENT AND TRADEMARK OFFICE
CERTIFICATE OF CORRECTION

PATENT NO. : 4,640,536

DATED : FEBRUARY 3, 1987

INVENTOR(S) : FREDERICK H. PRENTISS ET AL

It is certified that error appears in the above-identified patent and that said Letters Patent is hereby corrected as shown below:

Claim 7, col. 4, line 20, After "portions" insert ---,--- (comma)

Claim 7, col. 4, line 22, After "ing" delete "," (comma)

Claim 7, col. 4, line 22, After "bracket" insert ---to---

Signed and Sealed this

Seventeenth Day of November, 1987

Attest:

DONALD J. QUIGG

*Attesting Officer*                *Commissioner of Patents and Trademarks*